United States Patent [19]

Farnos et al.

[11] Patent Number: 5,451,387
[45] Date of Patent: Sep. 19, 1995

[54] SELECTIVE CATALYTIC REDUCTION OF NITROGEN OXIDES USING AN IRON IMPREGNATED ZEOLITE CATALYST

[75] Inventors: Maria D. Farnos, Wilmington, Del.; John P. McWilliams, Woodbury, N.J.; Sanjay B. Sharma, Langhorne, Pa.; David S. Shihabi, Pennington, N.J.; Scott A. Stevenson, Langhorne; James C. Vartuli, West Chester, both of Pa.

[73] Assignee: Mobil Oil Corporation, Fairfax, Va.

[21] Appl. No.: 271,692

[22] Filed: Jul. 7, 1994

[51] Int. Cl.6 ............................................. C01B 21/20
[52] U.S. Cl. .................................................. 423/239.2
[58] Field of Search ................. 423/239.2; 502/66, 68, 502/71, 85

[56] References Cited

U.S. PATENT DOCUMENTS

| | | | |
|---|---|---|---|
| 4,778,665 | 10/1988 | Krishnamurthy et al. | 423/239 |
| 4,867,954 | 9/1989 | Staniulis et al. | 423/239 |
| 4,961,917 | 10/1990 | Byrne | 423/239 |
| 5,024,981 | 6/1991 | Speronello et al. | 502/67 |
| 5,077,026 | 12/1991 | Nair et al. | 423/326 |
| 5,173,278 | 12/1992 | Marler et al. | 423/239 |
| 5,254,322 | 10/1993 | Bhore et al. | 423/239.2 |
| 5,271,913 | 12/1993 | Iida et al. | 423/213.2 |
| 5,279,997 | 1/1994 | Montreuil et al. | 502/62 |
| 5,310,714 | 5/1994 | Grasselli et al. | 502/64 |

FOREIGN PATENT DOCUMENTS 3157126  7/1991  Japan.

*Primary Examiner*—Michael Lewis
*Assistant Examiner*—Thomas G. Dunn, Jr.
*Attorney, Agent, or Firm*—A. J. McKillop; D. P. Santini; G. L. Harris

[57] ABSTRACT

An exhaust gas treatment process useful for the removal of nitrogen oxides using an iron containing zeolite as the catalyst and ammonia as a reducing agent. It is desired to extend the effective temperature range for the selective catalytic reduction (SCR) of nitrogen oxides below about 400° C. This is accomplished in the instant invention through the use of an intermediate pore size zeolite, such as ZSM-5, based catalyst which has been treated to incorporate iron into its pores.

20 Claims, No Drawings

SELECTIVE CATALYTIC REDUCTION OF NITROGEN OXIDES USING AN IRON IMPREGNATED ZEOLITE CATALYST

CROSS-REFERENCE TO RELATED APPLICATIONS

This application is related by disclosure of similar subject matter to U.S. application Ser. No. 07/910,861 filed Jul. 8, 1992, now U.S. Pat. No. 5,310,714, and to U.S. application Ser. No. 08/148,948, now U.S. Pat. No. 5,374,410.

FIELD OF THE INVENTION

This invention is concerned with the abatement of nitrogen oxides in industrial exhaust gases. In particular, it is concerned with a catalytic method for efficiently reacting the nitrogen oxides with ammonia before discharge to the atmosphere. It is more particularly concerned with the use of a specially prepared iron impregnated zeolite as the catalyst in the above method.

BACKGROUND OF THE INVENTION

Although several nitrogen oxides are known which are relatively stable at ambient conditions, it is generally recognized that at least two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various government authorities to restrict industrial emissions in an attempt to limit the level of the oxides in the atmosphere. Nitric oxide and nitrogen dioxide, under appropriate conditions, are interconvertible according to the equation.

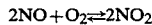

$$2NO + O_2 \rightleftharpoons 2NO_2$$

For purposes of the present invention, $NO_x$ will be used herein to represent nitric oxide, nitrogen dioxide, other nitrogen oxides, and mixtures thereof.

Formation of man-made nitrogen oxides from the elements occurs in the high temperature zones of combustion processes. The internal combustion engine, and coal or gas-fired or oil-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amount discharged in industrial and/or highly populated areas is adequate to cause problems. Other industrial sources of pollution also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of $NO_x$, approaching 3%.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that adding a reductant such as ammonia to the exhaust gas can, under appropriate reaction conditions, convert $NO_x$ to elemental nitrogen and steam.

The process of adding ammonia to industrial flue gas followed by contact with a catalyst at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction", or to "SCR", is intended to refer to only that process in which a mixture of $NO_x$ and $NH_3$ are induced to react catalytically at elevated temperatures, and to exclude processes in which other reductants such as CO or hydrogen gas are substituted for $NH_3$.

The term "denitrify" as used herein, means to reduce the amount of one or more noxious nitrogen compounds (such as NO, $NO_x$ and HCN) contained in a waste gas, preferably by conversion to nitrogen gas.

The use of zeolite-based catalysts for the SCR of nitrogen oxides with ammonia is well established. For example, U.S. Pat. No. 4,220,632 to Pence et al. discloses a process for reducing noxious nitrogen oxides from a fossil-fuel-fired power generation plant, or from other industrial plant off-gas streams, to elemental nitrogen and/or innocuous nitrogen oxides employing ammonia as the reductant and, as the catalyst, the hydrogen or sodium form of a zeolite having pore openings of about 3 to 10 Angstroms.

U.S. Pat. No. 5,173,278 to Marler et al. discloses an SCR process where the ammonia needed for the reduction of $NO_x$ is generated, at least in part, by hydrolysis of HCN over a supported transition metal and/or a crystalline zeolite catalyst. The process described in this patent appears to require that HCN be present.

In particular, it is known that the hydrogen form of ZSM-5 (HZSM-5) is well suited for this reaction at temperatures between about 400°–500° C. U.S. Pat. No. 4,778,665 to Krishnamurthy et al. describes an SCR process for pretreating industrial exhaust gases contaminated with $NO_x$ in which the catalyst has a silica to alumina ratio of at least about 20 and a Constraint Index of 1 to 12. The entire contents of this patent are incorporated herein by reference as if fully set forth.

At temperatures below about 400° C., HZSM-5 is significantly less efficient at removing nitrogen oxides from the gas stream.

BRIEF SUMMARY OF THE INVENTION

It has now been found that introducing iron to an intermediate pore size zeolite, e.g., ZSM-5, significantly improves the SCR activity of the catalyst at temperatures below about 400° C., without adversely affecting the $NO_x$ (e.g., NO and $NO_2$) reduction capacity of the catalyst above about 400° C. For example, the introduction of iron to ZSM-5 according to the method of this invention significantly increases the operational temperature range of the catalyst to generally about 200° C. to about 600° C. or higher, specifically about 200° C. to about 550° C., more specifically about 200° C. to about 400° C.

In this invention, iron is incorporated primarily into the pores of the zeolite. This is done by ion-exchanging the iron in an aqueous solution of a ferrous salt under inert conditions at a temperature sufficient to reduce the hydration sphere of the ferrous, Fe(II), cation to a size suitable to allow at least a portion of the iron to enter the pores of the zeolite. The ion-exchanged zeolite is then recovered and calcined. If desired, additional iron may be introduced by repeating the ion-exchange prior to or after the calcination step. Then a mixture of a $NO_x$ containing exhaust gas and ammonia is contacted with the calcined zeolite under conditions sufficient to convert a substantial portion of the $NO_x$ in the exhaust gas to $N_2$. This invention does not require that HCN be present in the gas mixture to be effective.

DETAILED DESCRIPTION

The term "exhaust gas" as used herein means any waste gas which is formed in an industrial process or operation and which is normally disposed of by discharge to the atmosphere, with or without additional treatment. "Exhaust gas" also includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 1000 ppm, of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

It has been found that a specially prepared iron containing zeolite, as more fully described below, provides a very efficient catalyst for the selective conversion of $NO_x$ in industrial exhaust gases. In this invention, the iron is incorporated on the zeolite by ion-exchanging the iron under suitable conditions. The ion-exchanged zeolite is typically recovered and calcined prior to use. The zeolite may be washed before being calcined. The zeolite is typically washed to remove any iron not associated with an exchange site. Generally, washing should remove most of the $Fe^{+2}$ cations left on the external surface of the zeolite crystal. If the catalyst is calcined without washing or before washing, iron may be left both inside and outside the zeolite crystal. An unwashed sample would, however, still have good $NO_x$ reduction activity, therefore, it is not necessary to wash the catalyst before calcination. The catalysts prepared according to the examples described herein, however, were washed before calcination. Also, a similar washing treatment could be used with other iron salts. Next, a mixture of a $NO_x$ containing exhaust gas and ammonia is contacted with the calcined zeolite under conditions effective to convert a substantial portion of the $NO_x$ in the exhaust gas to $N_2$. The gas to be treated may contain ammonia or ammonia may be added to the gas to be treated. This invention does not require that HCN be present in the gas mixture to be effective.

The conversion of $NO_x$ to $N_2$ is believed to proceed generally according to equations (1) and (2).

$$2NO_2 + 4NH_3 + O_2 \rightarrow 3N_2 + 6H_2O \qquad (1)$$

$$4NO + 4NH_3 + O_2 \rightarrow 4N_2 + 6H_2O \qquad (2)$$

The process of this invention is typically conducted by premixing the exhaust gas with ammonia at a temperature of at least about 200° C. and contacting the mixture with the catalyst at a temperature of about 200° C. to about 600° C. at a space velocity effective to induce the desired degree of conversion. In the event that the exhaust gas contains insufficient oxygen to at least satisfy the stoichiometry of equations (1) and (2), it is preferred to also include in the mixture adequate oxygen-containing gas such as air to provide the oxygen.

The method of this invention is advantageous in providing effective conversion at temperatures of 400° C. and lower.

The process of this invention generally provides that the $NO_x$ contaminated exhaust gas be mixed at a temperature of at least about 200° C. with gaseous ammonia. That this mixture be formed at an elevated temperature is important to avoid the formation of solid ammonium nitrite or nitrate, which is potentially hazardous. The amount of ammonia included in the mixture should be approximately the amount required to stoichiometrically react with the $NO_x$ present in the exhaust gases. If the mixture of ammonia and exhaust gas contains oxygen in an amount which at least satisfies the stoichiometry of Equations (1) and (2) shown above, then the stoichiometry is that given by those equations. In the event that the exhaust gas contains less oxygen than required by (1) and (2), it is preferred to add at least the required oxygen, although this invention is operable even with a deficiency of oxygen. With a deficiency, however, the stoichiometry changes, requiring somewhat less ammonia. This is illustrated by equations (3) and (4), which represent the stoichiometry in the total absence of oxygen.

$$6NO_2 + 8NH_3 \rightarrow 7N_2 + 12H_2O \qquad (3)$$

$$6NO + 4NH_3 \rightarrow 5N_2 + 6H_2O \qquad (4)$$

As used herein, the expression "approximate stoichiometric amount of ammonia" is intended to mean about 0.75 to about 1.25 times the molar amount of ammonia indicated in equations (1) and (2) when excess oxygen is present, these amounts being adjusted to reflect the somewhat lesser demand when operating with a deficiency of oxygen.

The mixture formed as described above is contacted with a crystalline zeolite molecular sieve catalyst having the properties described above. Crystalline zeolites are a known type of porous crystalline siliceous solid, and are described in Breck, "Zeolite Molecular Sieves", John Wiley and Sons, New York, N.Y. (1974), the entire content of which is incorporated herein by reference for background purposes.

The most common crystalline zeolites are those having robust 3-dimensional alumina silicate frameworks, and a large number of these are described by Breck (ibid). However, it is known that analogous framework structures may be synthesized where iron, boron, or other elements replace part or mostly all of the aluminum as the trivalent heteroatom. Crystalline materials having essentially the same crystal structure as a known zeolite, as evidenced by X-ray diffraction, but consisting essentially of silica, have been described. Some investigators have interpreted the term "zeolite" in a narrow sense, restricting it to framework compositions formed from silica and alumina. In the present application, such restricted definition is believed to be unduly narrow. The term "zeolite" is used herein to describe structures in which silica is the principal framework constituent and in which aluminum is the predominant trivalent heteroatom.

The exhaust gas and zeolite contacting is typically conducted at a temperature of about 200° C. to about 600° C. or more, e.g., up to about 1,000° C., and specifically at about 200° C. to about 550° C., more specifically at about 200° C. to about 400° C., and at a gas hourly space velocity, GHSV, (vols. of gas at STP per volume of catalyst per hour) adjusted to provide the desired conversion. The GHSV can be from about 1,000 to about 100,000 hr$^{-1}$, specifically from about 5,000 to about 50,000 hr$^{-1}$, more specifically from about 5,000 to about 20,000 hr$^{-1}$. The process of this invention is operable at subatmospheric to superatmospheric pressure, e.g. at about 5 to about 500 psia, and specifically at about 10 to about 50 psia, i.e. near atmospheric pressure.

In general, since the reaction is exothermic but low concentrations of NO$_x$ are present, adequate temperature control is readily achieved with a simple stationary fixed-bed of catalyst. However, other contacting means are contemplated, such as contacting with a fixed fluid bed, a transport bed, and a monolithic catalyst structure such as a honeycomb.

A catalyst useful in this invention will now be described in detail. It comprises an intermediate pore size zeolite (e.g., less than about 7 Angstroms pore size, such as from about 5 to less than about 7 Angstroms) having a silica to alumina ratio of at least about 5 and a Constraint Index of about 1 to about 12, said zeolite having been contacted in a suitable manner to incorporate iron into the pores of the crystal. The Constraint Index qualifies it as having an intermediate pore size, as will be more fully described below. Examples of such zeolites include ZSM-5 (U.S. Pat. No. 3,702,886 and Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein. Such zeolites are sometimes referred to as being of the ZSM-5 type, and this term may sometimes be used herein to designate zeolites useful in this invention.

The ZSM-5 type zeolites are members of a novel class of zeolites that exhibit unusual properties. Although these zeolites have unusually low alumina contents, i.e. high silica to alumina ratios, they are active for converting organic compounds. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure typically have a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

In W. M. Meier and D. H. Olson, "Atlas of Zeolite Structure Types," 138–139, Butterworth-Heineman, Boston, Mass., (3rd ed. 1992), and in Roland von Ballmoos and John B. Higgins, "Collection of Simulated XRD Powder Patterns for Zeolites," 10 Zeolites, 313S, at 442S-445S, and at 504S, Butterworth-Heineman, Boston, Mass. (2d ed. 1990), incorporated by reference herein, ZSM-5 and similar zeolites have been identified as having a framework topology that is identified as MFI. Also included in the second of the above references is the X-ray diffraction pattern for ZSM-5.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the Constraint Index may be made. The method by which Constraint Index is determined is described fully in U.S. Pat. No. 4,016,218, incorporated herein by reference for details of the method. Constraint Index (CI) values for some typical zeolites including some which are suitable as catalysts in the process of this invention are as follows:

| | CI (at test temperature) | |
|---|---|---|
| ZSM-4 | 0.5 | (316° C.) |
| ZSM-5 | 6-8.3 | (371° C.–316° C.) |
| ZSM-11 | 5-8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-48 | 3.5 | (538° C.) |
| ZSM-50 | 2.1 | (427° C.) |
| MCM-22 | 0.6-1.5 | (399° C.–454° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6-2.0 | (316° C.–399° C.) |

The above-described Constraint Index is an important and even critical definition of those zeolites which are useful in the process of the present invention. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of binder material. Similarly, other variables such as crystal size of the zeolite, the presence of occluded contaminants, etc., may affect the observed Constraint Index value. It will therefore be appreciated that it may be possible to select test conditions, e.g., temperature, as to establish more than one value for the Constraint Index of a particular zeolite. This explains the range of Constraint Indices for some zeolites, such as ZSM-5, ZSM-11, MCM-22, and Beta.

Zeolites useful in this invention may be incorporated in or composited with another material usually referred to as a matrix or binder. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the subbentonites and the kaolins commonly known as Dixie, McNamee, Ga. and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia, silica-zirconia, silica-thoria, silica-berylia, silicatitania, as well as ternary compounds such as silica-aluminathoria, silica-alumina-zirconia, silica-alumina-magnesia, and silica-magnesia-zirconia. A mixture of these components could also be used. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

Original ions, e.g., alkali or alkaline earth metal, of the as-synthesized ZSM-5 type material and any found in the ZSM-5/matrix material can be replaced in accordance with techniques well known in the art, at least in part, by ion-exchange with other ions. For the present catalyst composition, preferred replacing ions include hydrogen ions and hydrogen precursor, e.g., ammonium ions. ZSM-5 in the hydrogen exchanged form is referred to herein as HZSM-5. Typical ion-exchange techniques would be to contact the synthetic ZSM-5 type material or ZSM-5/matrix material with a solution containing a salt of the desired replacing ion or ions. Examples of such salts include the halides, e.g., chlorides, nitrates and sulfates. Representative ion-exchange techniques are disclosed in a wide variety of patents including U.S. Pat. Nos. 3,140,249; 3,140,251; and 3,140,253, incorporated by reference herein.

In one aspect of the present invention, ZSM-5 partially in the hydrogen form which has previously been used in an acid-catalyzed organic conversion reaction until it has become spent, i.e. not regenerable to an economically useful level, is useful in this invention. Carbon deposits that are on the spent catalyst should be removed by calcination prior to catalytic use herein. The term "spent", as used herein, does not necessarily mean that the catalyst has no activity, but rather that its activity is reduced and/or its cycle life is reduced, and/or its selectivity is reduced, to the point where it should be discharged. Typically, a spent dewaxing catalyst, for example, has an alpha value of about 40 (65 wt. % zeolite content) while the (steamed) fresh catalyst had an alpha value of about 65 (65 wt. % zeolite content), and the spent catalyst has a reduced cycle time between regenerations.

As mentioned above, catalysts useful in this invention comprise intermediate pore size or ZSM-5 type zeolites that include iron in the pores of the zeolite. While a substantial portion, e.g., more than half, of the iron present in the zeolite is preferably incorporated into the pores of the zeolite, it should be recognized that some of the iron may remain on the surface of the zeolite. Catalysts useful in this invention are typically prepared by ion-exchanging an aqueous solution of a ferrous, Fe(II), salt under inert conditions into the zeolite. The inert conditions are those effective to substantially prevent oxidation of the ferrous ion to the ferric form, such as using nitrogen, argon and the like inert gases to blanket the solution. The ion-exchange is typically conducted with stirring or mixing at a temperature of above about 55° C., specifically above about 65° C., or those temperatures effective to reduce the hydration sphere of the ferrous cation to a size small enough to enter the pores of the zeolite. The ferrous cation is reported to have an ionic radius in an aqueous solution of about 6 Å at 25° C., which is too large to enter ZSM-5 pores, which are slightly smaller than this. Increasing temperature is believed to reduce the size of the hydration sphere associated with the ferrous cation. For example, with increasing temperature, a ferrous compound, ferrous sulfate, changes from the heptahydrate form to the tetrahydrate form (at 56.6° C.) and then to the monohydrate form (at 65° C.).

The ion-exchange is typically conducted for more than about 4 hours, specifically from about 4 hours to several days, more specifically from about 6 hours to about 100 hours. During the ion-exchange, the pH of the aqueous solution is typically maintained between about 1 and about 4.5 or a pH level effective to prevent precipitation of the ferrous salt. The ion-exchange is typically conducted at conditions effective to exchange about 0.01 to about 5 wt. %, specifically about 0.01 to about 3 wt. %, more specifically about 0.05 to about 2.5 wt. %, most specifically about 0.1 to about 2 wt. %, iron into the zeolite, with about 2 wt. % preferred, however, a range of about 0.1 to about 0.5 wt. % is also effective.

It has been found that ferrous, Fe(II), ions are more readily exchanged into the zeolite than ferric, Fe(III), ions.

Ferrous, Fe(II), salts useful in this invention include the water soluble salts, such as, ferrous ammonium sulfate, ferrous chloride, ferrous fluosilicate, ferrous hyposulfite, ferrous iodide, ferrous lactate, ferrous nitrate, ferrous perchlorate, ferrous sulfate, and ferrous thiocyanate.

After the iron has been ion-exchanged into the zeolite, the zeolite is typically recovered by cooling the aqueous solution below about 55° C. to about 65° C., filtering the zeolite from the aqueous solution and washing the filtered zeolite with a neutral or slightly basic solvent, for example, an aqueous solvent with a pH of from about 6 to about 9, such as distilled or deionized water. The solvent washing is conducted at conditions effective to avoid leaching the iron from the zeolite. The aqueous solution and the ion-exchanged zeolite need not be maintained under inert conditions after the solution has been cooled.

The recovered catalyst is then thermally treated. This thermal treatment is generally performed by heating the catalyst at a temperature of at least about 200° C. for at least 1 minute and generally not longer than 48 hours. While subatmospheric or superatmospheric pressure can be employed for the thermal treatment, atmospheric pressure is preferred simply for reasons of convenience. The thermal treatment can be performed at a temperature up to a limit imposed by the irreversible thermal degradation of the crystalline structure of the zeolite, typically up to about 925° C. Typical thermal treatment temperatures are those above about 300° C., specifically above about 500° C. If desired, the thermal treatment conditions may be adjusted to leave a small amount of carbon on the zeolite.

The catalyst may also be hydrothermally treated at least once before use, specifically two or more hydrothermal treatments at different temperatures, e.g., increasing temperatures, may be used. This hydrothermal treatment may include contact of the catalyst or the catalyst and the binder with water vapor in air or another suitable gas stream, e.g., about 5 to about 100% steam, at a temperature of greater than about 400° C., specifically greater than about 700° C., for a period of from a few minutes to about 100 hours or more. Typical steaming conditions are described in U.S. Pat. Nos. 4,429,176; 4,522,929; 4,594,146; and 4,663,492; each incorporated by reference herein.

The form and the particle size of the catalyst are not critical to the present invention and may vary depending, for example, on the type of reaction system employed. Non-limiting examples of the shapes of the catalyst for use in the present invention include balls, pebbles, spheres, extrudates, channeled monoliths, honeycombed monoliths, microspheres, pellets or structural shapes, such as lobes, pills, cakes, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized bed systems, it is preferred that the major amount by weight of the particles have a diameter in the range of about 10 microns to about 250 microns, more preferably about 20 microns to about 150 microns.

As mentioned above, the catalyst of the present invention may also be deposited on or incorporated into a substrate, such as the matrix or binder mentioned above or a monolithic honeycomb structure. These monolithic structures may include ceramic monoliths, including those of cordierite, mullite, alpha ($\alpha$) alumina, or may include metal monoliths of aluminum-containing ferrite type stainless steel, austenite type stainless steel, among others. When the catalyst of this invention is deposited on a monolithic substrate, it is typically done using a wash coat. The wash coat may be prepared, for example, by adding silica sol and water to the catalyst powder, milling the mixture to form a thixotropic slurry, dipping the monolithic substrate into the slurry, and then drying and calcining the resulting structure. The zeolite may also be formed and extruded directly into a monolithic shape.

As noted above, the catalytic reduction of nitrogen oxides is substantially effected by the use of the present process. By substantially effected is meant a conversion of greater than about 80, 85, 90, 95, or even 99% or more of the nitrogen oxides and the ammonia present in the exhaust gas to innocuous compounds, such as nitrogen, through the use of this process. This is also referred to herein as conversion of a substantial portion of the $NO_x$ and $NH_3$ in the exhaust gas to innocuous compounds.

The invention will now be illustrated by examples. The examples are for illustrative purposes only and are not to be construed as limiting the scope of the invention, which scope is defined by this entire specification including the appended claims.

EXAMPLE 1

Base ZSM-5

A HZSM-5 sample, prepared according to U.S. Pat. No. 3,702,886, incorporated by reference herein, was used as the reference sample and was used as the basis for all of the other examples.

EXAMPLE 2

Preparation of an iron containing ZSM-5

An iron containing ZSM-5 sample was prepared by the following method: 100 g of distilled water was heated to about 85° C. with constant stirring under a blanket of dry nitrogen. Approximately 0.11 g of ferrous sulfate and 5.1 g of the same HZSM-5 as Example 1 were added to the heated water. A solution pH of about 2 was maintained by dropwise addition of nitric acid or ammonium hydroxide, as needed. The exchange solution was maintained at about 85° C. under a nitrogen blanket with continued stirring for approximately 17 hours. The solution was subsequently cooled to room temperature, filtered and washed with distilled water. The filtered solid was calcined in air for 8 hours at 538° C. to produce the iron containing catalyst, Catalyst A. The iron loading of this catalyst as prepared is about 0.5 wt. %.

EXAMPLE 3

Comparative testing against the base ZSM-5

In this example, the SCR activity of Catalyst A is compared with the base HZSM-5 catalyst from Example 1. The catalyst samples were evaluated using a fixed bed quartz reactor operating between 250°–550° C. The reactor inlet contained 500 ppm NO, 500 ppm $NH_3$, and 5 vol. % $O_2$ in a He carrier flowing at a constant gas hourly space velocity (GHSV) of 12,000 $hr^{-1}$. The effluent from the reactor was continuously monitored by non-dispersive infrared spectroscopy (NDIR) detectors. Catalyst activity results are reported below in Table 1.

TABLE 1

| Temperature, °C. | Percent N in Feed Converted to $N_2$ | |
| --- | --- | --- |
| | Base ZSM-5 Catalyst | Catalyst A |
| 550 | 89% | 93% |
| 455 | 100% | 98% |

TABLE 1-continued

| | Percent N in Feed Converted to $N_2$ | |
|---|---|---|
| Temperature, °C. | Base ZSM-5 Catalyst | Catalyst A |
| 400 | 100% | 98% |
| 345 | 71% | 97% |
| 250 | 26% | 92% |

EXAMPLE 4

Preparation of an Iron Containing ZSM-5

An iron containing ZSM-5 sample was prepared by the following method: a solution containing 25 g of the same HZSM-5 as Example 1 and 500 g of distilled water was heated to about 77° C. with constant stirring under a blanket of dry argon. Approximately 0.3 g of ammonium ferrous sulfate was added to the heated solution. A solution pH of 3 was maintained by dropwise addition of nitric acid or ammonium hydroxide, as needed. The exchange solution was maintained at about 77° C. under an argon blanket with continuous stirring for approximately 9 hours. The solution was subsequently cooled to room temperature, filtered and washed with distilled water. The filtered solid was calcined in air for 8 hours at 538° C. to produce the iron containing catalyst, Catalyst B. The iron loading of this catalyst as prepared is about 0.5 wt. %.

EXAMPLE 5

Comparative testing against a base ZSM-5

In this example, the SCR activity of Catalyst B is compared with the base HZSM-5 catalyst from Example 1. The catalyst samples were evaluated using a fixed bed quartz reactor operating between 250°–550° C. The reactor inlet contained 500 ppm NO, 500 ppm NH$_3$, and 5 vol.% O$_2$ in a He carrier flowing at a constant gas hourly space velocity (GHSV) of 12,000 hr$^{-1}$. The effluent from the reactor was continuously monitored by NDIR detectors. Catalyst activity results are reported below in Table 2.

TABLE 2

| | Percent N in Feed Converted to $N_2$ | |
|---|---|---|
| Temperature, °C. | Base ZSM-5 Catalyst | Catalyst B |
| 550 | 89% | 100% |
| 455 | 100% | 100% |
| 400 | 100% | 100% |
| 345 | 71% | 100% |
| 250 | 26% | 90% |

EXAMPLE 6

Preparation of an Iron Containing ZSM-5

An iron containing ZSM-5 sample was prepared by the following method: a solution containing 0.2354 g of ferrous acetate in 30 g distilled water was added to a flask containing 15 g of the same HZSM-5 as Example 1 at room temperature. The catalyst slurry was mixed for approximately 2 hours and was air dried at room temperature for about 16 hours. The dried catalyst was calcined in air for 8 hours at 538° C. to produce the iron containing catalyst, Catalyst C. The iron loading of this catalyst as prepared is about 0.5 wt. %.

EXAMPLE 7

Comparative testing against a base ZSM-5 and Catalyst A

In this example, the SCR activity of Catalyst C is compared with the base HZSM-5 catalyst from Example 1 and Catalyst A as prepared in Example 2. The catalyst samples were evaluated using a fixed bed quartz reactor operating between 250°–550° C. The reactor inlet contained 500 ppm NO, 500 ppm NH$_3$, and 5 vol. % O$_2$ in a He carrier flowing at a constant gas hourly space velocity (GHSV) of 12,000 hr$^{-1}$. The effluent from the reactor was continuously monitored by NDIR detectors. Catalyst activity results are reported below in Table 3.

TABLE 3

| | Percent N in Feed Converted to $N_2$ | | |
|---|---|---|---|
| Temperature, °C. | Base Catalyst | Catalyst A | Catalyst C |
| 550 | 89% | 93% | 89% |
| 455 | 100% | 98% | 91% |
| 400 | 100% | 98% | 91% |
| 345 | 71% | 97% | 90% |
| 250 | 26% | 92% | 85% |

Both methods of iron introduction into the catalyst, room temperature iron impregnation and elevated temperature ion-exchange, improve the activity of the catalysts to convert NO to N$_2$ over the base ZSM-5 catalyst. Unexpectedly, however, the catalyst prepared by iron impregnation at room temperature, Catalyst C, is less efficient at NO reduction than are the catalysts prepared by ion-exchange at an elevated temperature, Catalysts A and B. The ion-exchange method of this invention is believed, without intending to be bound thereby, to produce a catalyst with higher metal dispersion and a subsequent higher NO reduction activity, than the impregnation method.

We claim:

1. A method for selective catalytic reduction, prior to discharge, of an exhaust gas contaminated with NO$_x$ comprising:
   a) ion-exchanging iron in an aqueous solution onto an intermediate pore size zeolite under conditions effective to allow the iron to enter the pores of the zeolite, said conditions further effective to maintain the iron in solution during the ion-exchange treatment, said conditions still further effective to maintain the iron at a valence of 2 during the ion-exchange treatment;
   b) recovering the ion-exchanged zeolite at conditions effective to avoid leaching the iron from the pores of the zeolite;
   c) calcining the recovered zeolite;
   d) adding ammonia to the exhaust gas, thereby forming a mixture of the exhaust gas and the ammonia;
   e) contacting the gas mixture with said calcined zeolite at conditions effective to substantially convert the NO$_x$ and the ammonia to nitrogen and water.

2. The method according to claim 1 comprising preparing the iron containing aqueous solution using a ferrous salt.

3. The method according to claim 1 comprising preparing the iron containing aqueous solution under inert conditions.

4. The method according to claim 1 comprising ion-exchanging the iron into the zeolite under inert conditions.

5. The method according to claim 1 comprising preparing the ion-exchanged zeolite by multiple ion-exchange steps.

6. The method according to claim 1 comprising ion-exchanging the iron into the zeolite at a temperature greater than about 55° C.

7. The method according to claim 1 comprising ion-exchanging the iron into the zeolite by contacting the zeolite with the iron containing aqueous solution for a period of more than about 4 hours.

8. The method according to claim 1 comprising cooling the ion-exchanged zeolite and the iron containing aqueous solution and then recovering the ion-exchanged zeolite.

9. The method according to claim 7 comprising washing the recovered zeolite with an aqueous solution having a pH between about 6 and about 9.

10. The method according to claim 1 comprising combining the ion-exchanged zeolite with a substrate.

11. The method according to claim 1 comprising calcining the recovered zeolite in air at a temperature up to about 950° C.

12. The method according to claim 1 comprising contacting the gas mixture and the calcined zeolite at a temperature of about 200° C. to about 600° C., at a pressure of about 5 to about 500 psia, and at a gas hourly space velocity (GHSV) of about 1,000 to about 100,000 $hr^{-1}$.

13. The method according to claim 1 comprising ion-exchanging iron into the zeolite at conditions effective to deposit about 0.01 to about 5 wt. % iron in the pores of the zeolite.

14. The method according to claim 1 comprising ion-exchanging the iron into the zeolite at a pH of from about 1 to about 4.5.

15. The method according to claim 1 comprising ion-exchanging the iron into the zeolite at conditions sufficient to reduce the sphere of hydration of the iron to a size suitable to allow the iron to enter the pores of the zeolite.

16. The method according to claim 1 comprising selecting the zeolite from the intermediate pore zeolites ZSM-5, ZSM-11, ZSM-12, ZSM-21, ZSM-22, ZSM-23, ZSM-35, ZSM-38, ZSM-48, ZSM-57, and ZSM-58.

17. The method according to claim 1 comprising ion-exchanging the iron onto a zeolite having the MFI framework topology.

18. The method according to claim 1 comprising adding the approximate stoichiometric amount of ammonia.

19. The method according to claim 1 comprising preparing the aqueous solution using a ferrous salt selected from ferrous ammonium sulfate, ferrous chloride, ferrous fluosilicate, ferrous hyposulfite, ferrous iodide, ferrous lactate, ferrous nitrate, ferrous perchlorate, ferrous sulfate, and ferrous thiocyanate.

20. A process for selective catalytic reduction of oxides of nitrogen in a mixture of gases comprising oxygen and ammonia, which process comprises:
 a) ion-exchanging iron in an aqueous solution onto zeolite ZSM-5 at a temperature greater than about 75° C., with stirring, under an inert gas atmosphere, said iron having a valence of 2, said ion-exchange conditions effective to add about 0.1 to about 0.5 wt. % iron to the zeolite;
 b) washing the ion-exchanged zeolite with distilled or deionized water;
 c) calcining the washed zeolite in air at a temperature greater than about 300° C. for at least about 6 hours;
 d) contacting the gas mixture with the calcined zeolite in a reaction zone at a temperature less than about 400° C., at a pressure of about 10 to about 30 psia, and at a gas hourly space velocity of from about 1,000 to about 100,000 $hr^{-1}$;
 e) discharging the gas mixture from the reaction zone.

* * * * *